(12) United States Patent
Mänttäri et al.

(10) Patent No.: US 8,613,858 B2
(45) Date of Patent: Dec. 24, 2013

(54) SEPARATION PROCESS

(75) Inventors: Mika Mänttäri, Lappeenranta (FI); Elina Sjöman, Vaulammi (FI); Heikki Heikkilä, Espoo (FI); Hannu Koivikko, Kantvik (FI); Jutta Lindell, Iisalmi (FI)

(73) Assignee: Dupont Nutrition Biosciences APS, Copenhagen K (DK)

( * ) Notice: Subject to any disclaimer, the term of this patent is extended or adjusted under 35 U.S.C. 154(b) by 1020 days.

(21) Appl. No.: 12/091,249

(22) PCT Filed: Oct. 27, 2006

(86) PCT No.: PCT/FI2006/050465
§ 371 (c)(1),
(2), (4) Date: Aug. 1, 2008

(87) PCT Pub. No.: WO2007/048880
PCT Pub. Date: May 3, 2007

(65) Prior Publication Data
US 2009/0014386 A1    Jan. 15, 2009

Related U.S. Application Data

(60) Provisional application No. 60/799,513, filed on May 11, 2006.

(30) Foreign Application Priority Data
Oct. 28, 2005 (FI) .................. 20055581 U

(51) Int. Cl.
*B01D 61/02* (2006.01)
*B01D 61/12* (2006.01)
*C13K 1/02* (2006.01)
*C13K 1/04* (2006.01)

(52) U.S. Cl.
USPC ............ 210/639; 127/46.2; 127/55; 210/650; 210/651; 210/805; 536/127

(58) Field of Classification Search
USPC ........ 127/34, 40, 46.2, 46.3, 54, 55, 46.1, 53; 210/637, 639, 641, 650–654, 805, 806, 210/808; 536/127
See application file for complete search history.

(56) References Cited

U.S. PATENT DOCUMENTS

| | | | |
|---|---|---|---|
| 5,501,797 A * | 3/1996 | Meindersma et al. | 210/651 |
| 6,406,546 B1 * | 6/2002 | Donovan et al. | 127/55 |
| 6,406,547 B1 * | 6/2002 | Donovan et al. | 127/55 |
| 6,406,548 B1 * | 6/2002 | Donovan et al. | 127/55 |
| 6,440,222 B1 * | 8/2002 | Donovan et al. | 127/55 |

(Continued)

FOREIGN PATENT DOCUMENTS

| WO | WO 02/053783 | 7/2002 |
|---|---|---|
| WO | WO2004/003236 | 1/2004 |

OTHER PUBLICATIONS

European Search Report dated Dec. 23, 2009.

*Primary Examiner* — Joseph Drodge
(74) *Attorney, Agent, or Firm* — Scully, Scott, Murphy & Presser, P.C.

(57) ABSTRACT

The invention relates to a nanofiltration process for enriching and concentrating a neutral organic compound into the permeated liquid with negative retention.

27 Claims, 5 Drawing Sheets

(56) References Cited

U.S. PATENT DOCUMENTS

| | | | |
|---|---|---|---|
| 6,692,577 B2 * | 2/2004 | Heikkila et al. | 127/34 |
| 6,872,316 B2 * | 3/2005 | Heikkila et al. | 210/652 |
| 6,935,173 B2 * | 8/2005 | Stehman et al. | 73/304 C |
| 7,008,485 B2 * | 3/2006 | Heikkila et al. | 127/55 |
| 7,009,076 B2 * | 3/2006 | Paananen et al. | 562/554 |
| 7,611,872 B2 * | 11/2009 | Beck et al. | 435/106 |
| 2002/0153317 A1 * | 10/2002 | Heikkila et al. | 210/650 |
| 2004/0006222 A1 * | 1/2004 | Paananen et al. | 536/123.13 |
| 2004/0060868 A1 * | 4/2004 | Heikkila et al. | 210/650 |
| 2005/0056600 A1 * | 3/2005 | Ranney | 210/806 |
| 2005/0269265 A1 * | 12/2005 | DeFrees | 210/639 |
| 2007/0113840 A1 * | 5/2007 | Koivikko et al. | 127/40 |
| 2009/0173339 A1 * | 7/2009 | Heikkila et al. | 127/55 |
| 2009/0270609 A1 * | 10/2009 | Heikkila et al. | 536/127 |

* cited by examiner

SEPARATION PROCESS

CROSS-REFERENCE TO RELATED APPLICATIONS

This application claims the benefit of U.S. Provisional Application No. 60/799,513, filed on May 11, 2006, the entire contents of which is incorporated herein by its reference.

FIELD OF THE INVENTION

The present invention relates to an improved process of recovering a neutral organic compound by nanofiltration from a solution containing such compounds by regulating the permeation of said neutral compound in the nanofiltration process with negative retention.

BACKGROUND OF THE INVENTION

Nanofiltration is a pressure-driven membrane filtration process, falling between reverse osmosis and ultrafiltration. Separation mechanisms in nanofiltration vary between membranes because of material, tightness and their interactions with solutes and solvents of different kinds. Retention in nanofiltration is explained partly by sieving and partly by non-sieving mechanisms. The sieving (size exclusion) is often explained by differences in molar mass of solute or the molecular dimensions and pore size (or free volume) in the membrane structure. Although the sieving is often the dominating phenomenon to restrict the permeation of compounds it seldom explains the retention of salts or does not always explain the retention of organic compounds. Electrostatic repulsion, polarity, dielectric exclusion, hydrophobicity/hydrophilicity, etc. are known to affect the separation of different compounds.

Nanofiltration typically retains large and organic molecules with a molar mass greater than 300 g/mol. The most important nanofiltration membranes are composite membranes made by interfacial polymerisation. Polyether sulfone membranes, sulfonated polyether sulfone membranes, polyester membranes, polysulfone membranes, aromatic polyamide membranes, polyvinyl alcohol membranes and polypiperazine membranes are examples of widely used nanofiltration membranes. Inorganic and ceramic membranes can also be used for nanofiltration.

Nanofiltration membranes have been defined by their ability to reject only ions which have a negative charge over one, such as sulphate or phosphate, while passing single-charged ions. Another distinctive feature is their ability to reject uncharged, dissolved materials and positively charged ions according to the size and shape of the molecule in question. The nominal cut-off value of the molecular size relating to nanofiltration is defined to be in the range of 100-1000 g/mol.

Negative retention in nanofiltration has been observed earlier when salt solutions are filtered. A negatively charged membrane repels negatively charged ions and the higher is the charge of the ion the better it is repelled. This means that e.g. divalent sulphate ions are better retained than monovalent chloride ions. In order to maintain the electroneutrality on both sides of the membrane the permeation of chloride ions increases and even negative retention of chloride ions can be achieved (Donnan phenomenon). The permeation of chloride ions can be facilitated by adding more sulphate ions. When the proportion of sulphate and chloride ions increases the permeation of chloride ions increases. In other words when the amount of better retaining compounds increases the retention of less retained compounds decreases.

The effects of an organic ion on the nanofiltration separation of inorganic salts have been studied by I. Koyuncu and D. Topacik, in Journal of Membrane Science 195 (2002) 247-263.

The effect of inorganic salts on the nanofiltration separation of organic compounds has been studied by G. Bargeman et al., in Journal of Membrane Science 247 (2005) 11-20. It was found that the presence of salts ions, especially those for which the membrane show low retention, leads to reduction of the retention of neutral components such as glucose. The retention reduction was dependent on the membrane selected.

W. Koschuh et al., in Journal of Membrane Science 261 (2005) 121-128, found considerably lower retention values for arabinose, glucose, fructose and sucrose using PES004H (Nadir) and Inocermic (Inocermic/D) nanofiltration membranes than using PES10 (Nadir) N30F (Nadir) and MPF36 (Koch) nanofiltration membranes in nanofiltrating silage juice but no significant separation of a target compound was achieved.

G. Laufenberg et al., in Journal of Membrane Science 110 (1996) 59-68, has studied the effects of several carboxylic acids on the rejection of acetic, propionic and formic acids in binary and tertiary solutions in a reverse osmosis process.

U.S. Pat. No. 6,177,265, Roquette Freres (published Jan. 23, 2001) relates to a process for the manufacture of a starch hydrolysate with a high dextrose content. In this process, a starch milk is subjected to enzymatic treatment to obtain a raw saccharified hydrolysate. The hydrolysate thus obtained is then subjected to nanofiltering to collect as the nanofiltration permeate the desired starch hydrolysate with a high dextrose content. An improved dextrose enrichment of permeate was observed when the saccharified hydrolysate to be nanofiltered was not demineralised.

U.S. Pat. No. 6,406,546 B1, Tate & Lyle Industries (published Jun. 18, 2002) discloses a process of obtaining sucrose from a sucrose-containing syrup by nanofiltering the syrup through a nanofiltration membrane and recovering the nanofiltration retentate enriched in sucrose. It is recited that invert sugars are passed through the nanofiltration membrane into the nanofiltration permeate.

U.S. Pat. No. 5,965,028, Reilly Industries (published Oct. 12, 1999) discloses a process for the separation of citric acid from less desirable components having a molecular weight similar to that of citric acid (such as glucose and/or fructose) by nanofiltration. A nanofiltration permeate enriched in citric acid is recovered. The feed used for the nanofiltration is typically a clarified citric acid fermentation broth.

WO 02/053783 and WO 02/053781, Danisco Sweeteners Oy (published Jul. 11, 2002) disclose a process of producing a xylose solution from a biomass hydrolysate by subjecting the biomass hydrolysate to nanofiltration and recovering as the nanofiltration permeate a solution enriched in xylose. The feed used for the nanofiltration may be for example a spent sulphite pulping liquor containing a mixture of other closely-related monosaccharides, such as glucose, galactose, rhamnose, arabinose and mannose, in addition to the desired xylose. It was found that the nanofiltration effectively concentrated pentose sugars, such as xylose in the nanofiltration permeate, while hexose sugars remained in the nanofiltration retentate. However, the permeate obtained from the nanofiltration had a relatively low dry substance content (1 to 2%) and consequently a low xylose content. Furthermore, the xylose yields were low (less than 20%). Hereby the performance of the process was not sufficient for industrial operation.

Thus, nanofiltration has been used for separating neutral organic compounds such as monosaccharides like glucose from di- and higher saccharides. In addition, it has been used to separate citric acid from glucose and/or fructose. However, when nanofiltration is used to separate neutral organic compounds such as monosaccharides from each other so that the compound to be recovered is found in the permeated liquid, water has to be added to the retentate side to facilitate sufficient product yield in the permeate. This, however, leads to considerable dilution of the product compound in the permeate side.

BRIEF DESCRIPTION OF THE INVENTION

The invention relates to a process of recovering a neutral organic compound by nanofiltration from a solution containing such compounds by regulating the permeation of said neutral compound in the nanofiltration process with negative retention.

Negative retention as such means that the concentration (g/100 g or g/l of solution or %) of a certain compound is higher at the permeated liquid than it is in the retentate at the same point of time. Thus, coexistent concentrations of a certain compound on the opposite sides of the nanofiltration membrane are compared with each other.

Further, the invention relates to a nanofiltration process for enriching and concentrating a neutral organic compound into the nanofiltration permeate with negative retention or reducing of retention of the neutral organic compound or at least intensifying the permeation of the neutral compound. Intensification of the permeation of the neutral compound is observed as a faster permeation of the neutral compound or as a higher permeate flux or as a higher content of the neutral compound (% on DS and/or g/100 g solution and/or g/l solution) in the permeate when compared to the corresponding results received in a process performed without any of the adjustment actions of the present invention.

In addition, the present invention relates to use of the nanofiltration process parameters such as the pH, the flux, the pressure, the temperature, the feed concentration and the concentration ratio of the neutral organic compound (i.e., the target compound) and the other organic compound in the feed solution, in creating negative retention or reducing of retention of the neutral organic compound or in intensifying the permeation of the neutral organic compound.

Thus, the present invention provides a method for recovering a neutral organic compound by nanofiltration from solutions containing such compound(s) so as to alleviate the above disadvantages relating to the known methods, especially the problems relating to insufficient performance of the known methods, including excess dilution and low product yields, which make these processes uneconomical in industrial scale.

Regulation of the permeation of a neutral organic compound with negative retention in nanofiltration leads to the enrichment of the product compound (i.e., the compound to be recovered from the permeate) into permeate with good yield and minor dilution of the dry solids content. Simultaneously, a favourable enrichment of the compound to be recovered in the nanofiltration permeate together with a lesser degree of dilution of the nanofiltration permeate were obtained, which resulted in good performance of the nanofiltration operation.

BRIEF DESCRIPTION OF THE DRAWINGS

The following drawings are illustrative embodiments of the invention and are not meant to limit the scope of the invention.

DETAILED DESCRIPTION OF THE INVENTION

Figure 1:
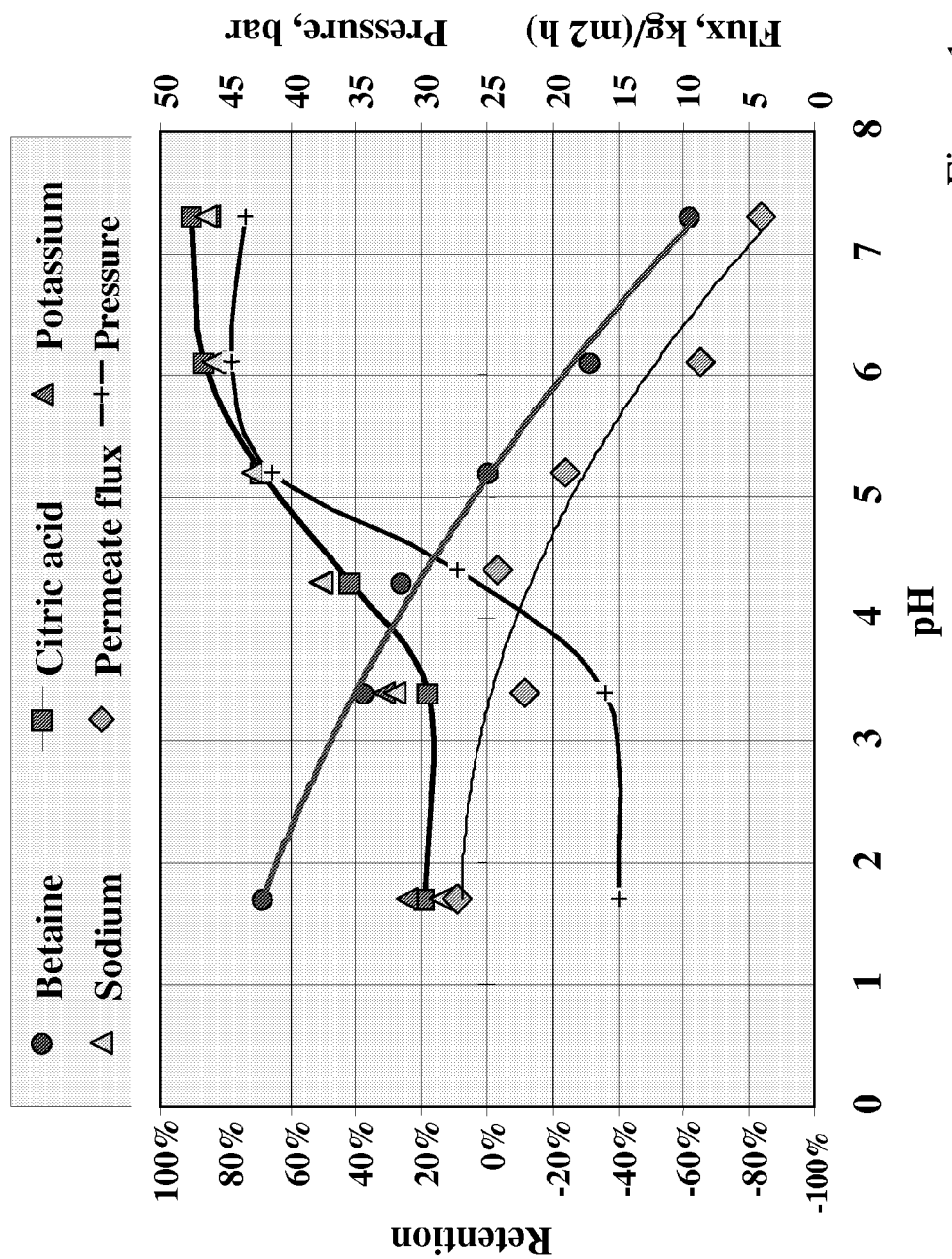
FIG. 1 is a graphical presentation of the retentions of citric acid, betaine and potassium sulphate in the nanofiltration of Example 5A.

It has been found that when a solution containing a neutral organic compound and more strongly retentable organic compounds is nanofiltrated, the organic neutral compound to be recovered from the permeate is concentrated into the permeate, i.e., its concentration (g/100 g solution or g/l solution or % in solution) in the permeate is higher than its concentration in the retentate at a certain time point of the nanofiltration process or the concentration of the neutral compound to be recovered in permeate is only slightly lower than in retentate.

This observation can be utilized for example in separating by nanofiltration monosaccharides from lignocellulose hydrolysates, which contain lots of different types of neutral organic compounds, such as carbohydrates of different molecular weights, different types of mono-, di- and oligosaccharides, organic acids and inorganic and organic salts.

Particularly, when the concentration of the compound to be recovered from the permeate is low in the nanofiltration feed and/or in the retentate, it is especially important that no further dilution of the permeation solution occurs. In addition, it is especially advantageous to further elevate the concentration of the compound to be recovered from the permeate, or in other words to simultaneously enrich and concentrate the compound to be recovered from the permeate by the nanofiltration process of the invention.

Situations where the concentration of the compound to be recovered from the permeate is low in the nanofiltration retentate are often developed during the end phase of the nanofiltration process, when maximising the yield of the permeated compound is a target. In those conditions the filtration becomes slower and/or the fluxes through the membrane decline.

According to the present invention, permeation of a neutral organic compound could be intensified or strengthened, or even negative retention can be created by adding to the nanofiltration feed solution an other organic compound which has higher tendency to retentate than the neutral organic compound to be recovered from the permeate and/or has a molecular size slightly bigger than that of the compound to be recovered from the permeate. The compound selected to be added to the nanofiltration process depends naturally on the compound to be recovered from the permeate. Examples of such other compounds are monosaccharides such as glucose, disaccharides such as maltose, lactose, cellobiose, rhamnogalactose, or cellulose hydrolysates, hemicellulose hydrolysates, organic acids, such as hydroxy acids e.g. citric acid, aldonic acids such as xylonic acid and gluconic acid and (Na—, Ca— etc)—salts of respective organic acids. This other compound can be added e.g. in the form of a process liquor for example in the form of a mother liquor from crystallization of the organic compound, or in the form of the xylonic acid rich fraction from the chromatographic separation of sulphite spent liquor. Addition of the other organic compound is especially advantageously performed to maximise the yield at the end of an industrial nanofiltration process, where the content of the neutral organic compound in the retentate is low in relation to % on dry substance (D.S.) and to concentration (g/100 g solution or g/l solution) and in a nanofiltration process where the content of the neutral organic compound in the nanofiltration feed is relatively low.

The present invention relates to a nanofiltration process of a multi-component or binary solution of organic compounds, wherein a neutral organic compound is enriched, and its retention is decreased or its permeation is intensified into the permeated liquid by regulating the conditions of the nanofiltration. Further, the present invention relates to a nanofiltration process for enriching and concentrating a neutral organic compound into the permeated liquid from a nanofitration feed solution by regulating the conditions of the nanofiltration process to form negative retention of the neutral organic compound or at least intensifying the permeation of the neutral organic compound.

Enriching refers to increasing the content of a target compound on total dry solids of the liquid. Concentrating refers to increasing the content of a target compound in liquid solution (e.g. g/100 g solution). Intensifying the permeation of the neutral compound refers to a faster permeation of the neutral compound or as a higher permeate flux or as a higher content of the neutral compound (% on DS and/or e.g. g/100 g solution) in the permeate when compared to the corresponding results received in a process performed without any of the adjustment actions/steps of the present invention. In one embodiment of the invention, retention of the neutral organic compound is reduced or its negative retention is achieved by increasing in feed/retentate the content of the other organic compound, which can be facilitated by adding an other organic compound to the nanofiltration feed/retentate solution or by improved accumulatation into the retentate during nanofiltration in recycling mode. The other organic compound to be added has higher tendency to retentate than the neutral organic compound to be recovered from the permeate. It preferably has a molar mass higher than the neutral organic compound i.e., the target compound. When the target compound is a monosaccharide, suitable compounds to be added are for example glucose, disaccharides such as lactose, maltose and cellobiose, or organic acids such as hydroxy acids (e.g. citric acid) or aldonic acids such as xylonic acid and gluconic acid.

In another embodiment of the invention, negative retention of the neutral organic compound or the intensification of the permeation of the neutral organic compound is formed/obtained by adjusting the parameters of the nanofiltration process. Suitable parameters are for example the pH, the flux, the pressure, the temperature, the feed concentration, the concentration ratio of certain feed components and/or decreasing the concentration of the target compound in relation to other neutral compounds in the feed solution.

The adjustment of the pH is especially advantageous in cases where more retentable other organic compound is acid and/or ionizable compound. The pH is adjusted to the range of 1 to 11, more preferably to the range of 2 to 7 and most preferably to the pH range of 4 to 6.

The total flux of the solution is preferably adjusted within the range of 0.7-15, more preferably within the range 1-6 and most preferably within the range of 1-4 kg/(m$^2$h) solution.

The total concentration of the feed solution is adjusted preferably within the range of 50-600 g/l (5-60% D.S) more preferably 200-300 g/l (20-30% D.S.).

The concentration of the target compound in relation to other organic compound(s) in the feed/retentate solution is preferably at least 1:3, more preferably at least 1:5. Advantageous ratios are within the range 1:5-1:10.

In one embodiment of the invention when feed solution is a multicomponent or binary mixture of compounds and the organic compound therein is selected from organic acids or aldonic acids or salts thereof, retention of the organic compound is intensified by increasing the pH of the feed solution to be as high as the pK-value of the acid or higher. Simultaneously permeation of the neutral compound of the mixture e.g. betaine, glycerol, inositol or xylose is increased significantly and enrichment and concentration of the neutral compound is achieved.

For example, when a feed solution containing betaine, glycerol or inositol and citric acid was filtered using Desal 5 DL membrane (GE Osmonics), the retention of the neutral compounds betaine, glycerol and inositol was dramatically decreased when pH of the feed solution was increased leading to the significantly improved negative retention of betaine and glycerol and significantly intensified permeation of inositol. At the same time citric acid as a compound capable to dissociate was much better retained at higher pH's. Thus the separation of citric acid from betaine, glycerol and inositol in nanofiltration was greatly enhanced.

The neutral organic compound to be recovered from permeate is selected form carbohydrates such as sugars and sugar alcohols. Examples of these compounds are xylose, arabinose, glucose, galactose, rhamnose, fructose and mannose and their corresponding sugar alcohols. Betaine, glycerol and inositol are further examples of neutral organic compounds to be recovered from permeate in the present invention.

The process of the invention provides a typical yield for the neutral organic compound to be recovered from the permeate of more than 20%.

The nanofiltration in accordance with the present invention is carried out at a temperature range of 10-150° C., preferably 30-95° C. and most preferably 40-70° C. The nanofiltration pressure is in the range of 10-90 bar, preferably 20-70 bar and most preferably 30-45 bar.

The nanofiltration membrane used in the present invention may be selected from polymeric and inorganic membranes. The cut-off size of the membranes is 150-1000 g/mol, preferably 150 to 250 g/mol.

Typical polymeric nanofiltration membranes useful in the present invention include, for example, polyether sulfone membranes, sulfonated polyether sulfone membranes, polyester membranes, polysulfone membranes, aromatic polyamide membranes, polyvinyl alcohol membranes and polypiperazine membranes and combinations thereof. Cellulose acetate membranes are also useful as nanofiltration membranes in the present invention.

Typical inorganic membranes include $ZrO_2$- and $Al_2O_3$-membranes, for example.

Preferred nanofiltration membranes are selected from sulfonated polysulfone membranes and polypiperazine membranes. For example, useful membranes are Desal-5 DK and Desal-5 DL nanofiltration membranes manufactured by GE Osmonics/General Electric Co. Water technologies.

The nanofiltration membranes which are useful in the present invention may have a negative or positive charge. The membranes may be ionic membranes, i.e. they may contain cationic or anionic groups, but even neutral membranes are useful. The nanofiltration membranes may be selected from hydrophobic and hydrophilic membranes.

The typical form of nanofiltration membranes is a flat sheet form. The membrane configuration may also be selected e.g.

from tubes, spiral wound membranes and hollow fibers. "High shear" membranes, such as vibrating membranes and rotating membranes can also be used.

Before the nanofiltration procedure, the nanofiltration membranes may be pretreated by washing with a washing agent, typically with an acidic washing agent. Also alkaline washing agents or alcohols may be used.

The solution used as the nanofiltration feed in the present invention may be obtained from the hydrolysis of any plant-based biomass, typically xylan-containing vegetable material. In one preferred embodiment of the invention, the hydrolysate of xylan-containing vegetable material comprises a hydrolysate of lignocellulosic material, typically wood material. Wood material be derived from various wood species, particularly hardwood, such as birch, aspen and beech. Furthermore, the xylan-containing vegetable material in connection with the present invention may comprise various parts of grain (such as straw and husks, particularly corn and barley husks and corn cobs and corn fibers), bagasse, cocoanut shells, cottonseed skins etc.

The biomass hydrolysate used as the nanofiltration feed may be obtained from direct acid hydrolysis of biomass, from enzymatic or acid hydrolysis of a prehydrolysate obtained from biomass by prehydrolysis (with steam or acetic acid, for instance), and especially from sulphite pulping processes.

The biomass hydrolysate used as starting material in the process of the invention may be also a part of a biomass hydrolysate obtained from hydrolysis of biomass-based material. Said part of a biomass hydrolysate may be a prepurified hydrolysate obtained e.g. by ultrafiltration or chromatography.

The biomass hydrolysate in accordance with the present invention may be a spent liquor obtained from a pulping process. A typical spent liquor useful in the present invention is a xylose-containing spent sulphite pulping liquor, which is preferably obtained from acid sulphite pulping. The spent liquor may be obtained directly from sulphite pulping. It may also be a concentrated sulphite pulping liquor or a side-relief obtained from sulphite cooking. It may also be a xylose-containing fraction chromatographically obtained from a sulphite pulping liquor or a permeate obtained by ultrafiltration of a sulphite pulping liquor. Furthermore, a post-hydrolyzed spent liquor obtained from neutral cooking is suitable. The spent liquor useful in the present invention is preferably obtained from hardwood pulping. A spent liquor obtained from softwood pulping is also suitable, preferably after the main part of hexoses have been removed e.g. by fermentation.

In the present invention, the spent liquor to be treated may also be any other liquor obtained from the digestion or hydrolysis of plant-based biomass, typically cellulosic material with an acid. Such a hydrolysate can be obtained from cellulosic material for example by treatment with an inorganic acid, such as hydrochloric acid, sulphuric acid, sulphur dioxide or nitric acid, or by treatment with an organic acid, such as formic acid or acetic acid. A spent liquor obtained from a solvent-based pulping, such as ethanol-based pulping may also be used. Spent liquor from sa-cooking or a xylan-containing fraction thereof recovered by ultrafiltration is also useful for the invention. A biomass-based distillation residue may also be used. Such a distillation residue may be obtained for example from the distillation of ethanol.

In addition to xylose, the spent hardwood sulphite pulping liquor also contains other monosaccharides in a typical amount of 3 to 30%, based on the xylose content. Said other monosaccharides include e.g. glucose, galactose, rhamnose, arabinose and mannose. Xylose and arabinose are pentose sugars, whereas glucose, galactose, rhamnose and mannose are hexose sugars. Furthermore, the spent hardwood sulphite pulping liquor typically includes rests of pulping chemicals and reaction products of the pulping chemicals, lignosulphonates, oligosaccharides, disaccharides, xylonic acid, uronic acids, metal cations, such as calcium and magnesium cations, and sulphate and sulphite ions. The biomass hydrolysate used as a starting material also contains acids used for the hydrolysis of the biomass.

The sugar beet based solution of the present invention is any solution, hydrolysate and/or extract derived from sugar beet. The solution may be obtained from further processing of such beet derived solutions by fermentation, for example a citric acid, yeast or an ethanol fermentation or from the processing of sugar beet derived solutions, such as beet and/or betaine molasses or vinasse. Fermentation solutions, molasses and vinasse are typically rich in inorganic salts and contain a mixture of various kinds of organic compounds e.g. betaine, polyols such as erythritol, inositol, mannitol and glycerol and/or carboxylic acids such as citric acid, lactic acid, acetic acid, oxalic acid and pyrrolidone carboxylic acid and/or mixtures thereof.

The process may also comprise one or more pretreatment steps. The pretreatment before the nanofiltration is typically selected from ion exchange, membrane filtration, such as ultrafiltration, chromatography, concentration, pH adjustment, filtration, dilution and combinations thereof. Before the nanofiltration, the starting liquor may thus be preferably pretreated by ultrafiltration or chromatography, for example. Furthermore, a prefiltering step to remove the solid substances can be used before the nanofiltration. The pretreatment of the starting liquor may also comprise concentration, e.g. by evaporation, and neutralization. The pretreatment may also comprise crystallization, whereby the starting liquor may also be mother liquor obtained from the crystallization of xylose, for example.

In a typical nanofiltration operation, the liquor to be treated, such as spent liquor is fed through the nanofiltration equipment provided with nanofiltration membranes at the temperature and pressure conditions described above. The liquor is thus fractionated into a low molar mass fraction including xylose (permeate) and a high molar mass fraction including the non-desired components of the spent liquor (retentate).

The nanofiltration equipment useful in the present invention comprises at least one nanofiltration membrane element dividing the feed into a retentate and permeate section. The nanofiltration equipment typically also includes means for controlling the pressure and flow, such as pumps and valves and flow and pressure meters and density meters. The equipment may also include several nanofiltration membrane elements in different combinations, arranged in parallel or series.

The flux of the permeate varies in accordance with the pressure. In general, at a normal operation range, the higher the pressure, the higher the flux. The flux also varies with the temperature. An increase of the operating temperature normally increases the flux. However, with higher temperatures and with higher pressures there is an increased tendency for a membrane rupture. For inorganic membranes, higher temperatures and pressures and higher pH ranges can be used than for polymeric membranes.

The nanofiltration process in accordance with the present invention can be carried out batchwise or continuously, typically as a multi-stage process. The process in accordance with the present invention can be carried out using a recycling mode.

The process of the present invention may also comprise one or more post-treatment steps. The post-treatment steps are typically selected from ion exchange, crystallization, chromatography, reverse osmosis, concentration by evaporation, colour removal, extraction and precipitation.

After nanofiltration, the neutral organic compound may be recovered from the permeate, e.g. by crystallization. The nanofiltered solution can be used as such for the crystallization, without further purification and separation steps. If desired, the nanofiltered liquor containing the neutral organic compound may be subjected to further purification, e.g. by chromatography, ion exchange, concentration e.g. by evaporation or reverse osmosis, or colour removal.

The following examples, which are not construed as limiting the scope of the invention, will describe the invention in greater detail.

In the examples and throughout the specification and claims, the following definitions have been used:

DS refers to the dry substance content measured by Karl Fischer titration, expressed as % by weight.

Flux refers to the amount (liters or kg) of the solution that permeates through the nanofiltration membrane during one hour calculated per one square meter of the membrane surface, $l/(m^2h)$ or $kg/(m^2h)$.

HPLC (for the determination of carbohydrates) refers to liquid chromatography.

In the examples, the retention for compounds/substances was calculated based on equation as follows.

$$\text{Retention } R(\%), R = \left(1 - \frac{C_p^i}{C_f^i}\right) * 100\% \quad (1)$$

$C_p^i$ g/100 g of substance $i$ in permeate $C_f^i$ g/100 g of substance $i$ in retentate/feed Furthermore, it is clear to one skilled in the art that the experimental results of different examples presented hereinafter are not directly comparable with each other due e.g. to the fouling of the membranes, the osmotic effects on the membranes, membrane types and the equipment design.

EXAMPLE 1

Two nanofiltration feed solutions were prepared from crystalline xylose and glucose. Dry substance of both feed liquids was adjusted to 30 w-% and two ratios of xylose to glucose were used. In first feed mass ratio of xylose to glucose was 1:9 and in second feed solution mass ratio of xylose to glucose was 9:1.

These feed liquids were subjected to nanofiltration with DDS Lab-Stak M20 laboratory membrane unit equipped with Desal 5 DL, Desal 5 DK (both GE Osmonics) and NF 270 (Dow Filmtec. USA) membranes. The nanofiltration was done in full circulation mode where all permeate was led back to the feed tank. The experiment was done at two flux levels which were achieved by adjusting feed inlet pressure to 10 bar and 30 bar. Temperature of the retentate was controlled during the test to be at 50° C.

The permeate fluxes were registered at each point and samples were taken simultaneously from permeate and retentate. Sugar concentrations of all samples were analysed by HPLC and retentions at each point were calculated.

When nanofiltration was done with low ratio of xylose:glucose (1:9) significant negative retention of xylose was created. Especially remarkable this effect was at low flux level (fluxes 0.7-1.3 kg of solution/m²/h) which was the case with the low 10 bar feed pressure. In addition to that negative retention was still seen if low xylose:glucose ratio feed was used and higher 30 bar pressure was used. In this case though the effect was less remarkable. With Dow NF 270 negative retention of xylose could not be detected at higher 30 bar feed pressure. The results are shown in Tables 1 and 2.

TABLE 1

FEED D.S. 30 W-%, MASS RATIO OF XYLOSE TO GLUCOSE 1:9, FEED PRESSURE 10 BAR

| Membrane | Flux kg/m²/h | Xylose retention % |
|---|---|---|
| DK | 0.77 | −8.8 |
| DL | 1.07 | −6.0 |
| NF270 | 1.28 | −2.9 |

TABLE 2

FEED D.S. 30 W-%, MASS RATIO OF XYLOSE TO GLUCOSE 1:9, FEED PRESSURE 30 BAR

| Membrane | Flux kg/m²/h | Xylose retention % |
|---|---|---|
| DK | 2.58 | −2.2 |
| DL | 3.43 | −2.8 |
| NF270 | 4.04 | 1.7 |

The second run with high xylose:glucose ratio (9:1) resulted no negative retention at the tested conditions. The results are shown in Tables 3 and 4.

TABLE 3

FEED D.S. 30 W-%, MASS RATIO OF XYLOSE TO GLUCOSE 9:1, FEED PRESSURE 10 BAR

| Membrane | Flux kg/m²/h | Xylose retention % |
|---|---|---|
| DK | 1.88 | 6.4 |
| DL | 2.70 | 6.1 |
| NF270 | 2.76 | 1.2 |

TABLE 4

FEED D.S. 30 W-%, MASS RATIO OF XYLOSE TO GLUCOSE 9:1, FEED PRESSURE 30 BAR

| Membrane | Flux kg/m²/h | Xylose retention % |
|---|---|---|
| DK | 6.28 | 13.7 |
| DL | 8.10 | 12.0 |
| NF270 | 7.95 | 12.6 |

EXAMPLE 2

Xylose containing wood hemicellulose hydrolysate (pH~3.0) was subjected to nanofiltration. A continuous nanofiltration run was carried out with a nanofiltration pilot unit including three nanofiltration stages in series. The pilot unit was equipped with Osmonics Desal 5 DL 4" spiral wound membranes and the conditions in filtration were set to 33 bars inlet pressure and 65° C. temperature.

Composition of the nanofiltration feed solution is described below:

| Composition of NF feed solution | |
|---|---|
| Dry substance, g/100 g | 7.5 |
| pH (as is) | 3.0 |
| Xylose, g/100 g | 2.3 |
| Glucose, g/100 g | 1.2 |
| Other monosaccharides, g/100 g | 3.4 |
| Xylonic acid g/100 g | 3.5 |
| Acetic acid, g/100 g | 1.3 |
| $Mg^{2+}$, g/100 g | 1.2 |
| $SO_4^{2-}$, g/100 g | 2.1 |
| $SO_3^{2-}$, g/100 g | 0.2 |
| K, g/100 g | 0.1 |
| Others, g/100 g | 2.2 |

Nanofiltration was operated with 90% xylose yield to permeate and retentate dry substance was adjusted to 26 g/100 g with water. In the equilibrium conditions final retentate and permeate samples from each three stages were collected. The result including HPLC analyses for the retentate fraction, for the permeate fractions and for the combined permeate fraction are set forth in table 5 below.

TABLE 5

| Fraction | DS | Xylose g/100 g | Glucose g/100 g | Other monosaccharides g/100 g | Ratio xylose other sugars |
|---|---|---|---|---|---|
| Retentate 1$^{st}$ stage | 27 | 10.2 | 1.3 | 3.5 | 2.13 |
| Retentate 2$^{nd}$ stage | 25.6 | 7.9 | 1.2 | 3.2 | 1.80 |
| Retentate 3$^{rd}$ stage | 25.5 | 5.2 | 1 | 2.3 | 1.58 |

| Fraction | DS | Xylose g/100 g | Glucose g/100 g | Other monosaccharides g/100 g |
|---|---|---|---|---|
| Permeate 1$^{st}$ stage | 16 | 8.2 | 0.5 | 1.6 |
| Permeate 2$^{nd}$ stage | 15 | 7.5 | 0.7 | 1.8 |
| Permeate 3$^{rd}$ stage | 13.9 | 6 | 0.8 | 2 |

Retention of xylose and glucose and other monosaccharides at the equilibrium conditions are presented in the table 6 below. An improved xylose permeation was achieved by negative retention of xylose together with increased ratio of less permeable components in 3$^{rd}$ loop (stage).

TABLE 6

| | Xylose retention % | Glucose retention % | Other monosaccharides retention % |
|---|---|---|---|
| Permeate 1$^{st}$ stage | 20 | 62 | 54 |
| Permeate 2$^{nd}$ stage | 5 | 42 | 44 |
| Permeate 3$^{rd}$ stage | −15 | 20 | 13 |

EXAMPLE 3

Nanofiltration of three xylose solutions from different separation steps of acid spent sulphite pulping liquor was carried out. Average compositions of the feed/retentate solutions are shown in Table 7.

TABLE 7

COMPOSITION OF THE FEED/RETENTATE SOLUTIONS

| | Composition, % on DS | | |
|---|---|---|---|
| Component | Solution A | Solution B | Solution C |
| Xylose | 11.5 | 20.8 | 50.0 |
| Glucose | 1.9 | 5.8 | 4.1 |
| Galactose + rhamnose | 1.2 | 5.0 | 3.7 |
| Arabinose + mannose | 1.3 | 6.8 | 5.0 |
| Xylonic acid | 4.3 | 13.6 | 6.9 |
| Xylobiose | 0.1 | 0.1 | 0.0 |
| Acetic acid | 1.8 | 1.1 | 1.6 |
| Salts | 5.2 | 6.9 | 4.5 |
| pH | 5.2 | 4.2 | 4.9 |

* salts are the sum of Na, K, Ca, Mg, $SO_3$ and $SO_4$

The experimental procedure is shown in table 8.

TABLE 8

EXPERIMENTS

| Feed/retentate solution | °C. | pH | $p_{in}$, bar | Dry substance content of the feed/retentate, % |
|---|---|---|---|---|
| A | 60 | 5.5 | 40 | 40→35→30→22→15→11 |
| B | 60 | 5.5 | 40 | 40→35→30→22→15→11 |
| C | 60 | 5.5 | 40 | 40→35→30→22→15→11 |

The experiments were done at constant temperature and pressure. For each dry substance of the feed/retentate, filtration was run in batch concentration mode for two hours. After the two hours' concentration, all the collected permeate was circulated back to the feed tank and the feed was diluted with water to the next feed dry substance concentration. The size of the batch was 100 litres. The pH of the feed solution was adjusted to 5.5 with MgO.

The nanofiltration equipment was DSS LabStack M20 equipped with 10 Desal 5-DK (Osmonics), 10 Desal 5-DL (Osmonics) and 2 NFT-50 (DSS). Each membrane had a membrane area of 0.018 m$^2$.

The results from the three experiments are presented in the tables 9, 10 and 11 below. With all tested feed/retentate solutions negative retentions were achieved at higher feed concentrations. The lower the xylose ratio to the other components was the stronger was the negative retention created.

TABLE 9

| | | | | | | | | |
|---|---|---|---|---|---|---|---|---|
| Xylose solution A | Feed d.s. | % | 41.4 | 37.8 | 32.0 | 23.2 | 17.1 | 12.2 |
| | xylose | %/d.s. | 11.5 | 11.6 | 11.4 | 11.1 | 10.9 | 10.9 |
| | xylose | g/100 g | 4.7 | 4.4 | 3.6 | 2.6 | 1.9 | 1.3 |
| Permeate from | Perm. flux | kg/m$^2$/h | 2.0 | 3.9 | 6.1 | 17.7 | 21.4 | 19.5 |
| Desal-5 DK | Perm. d.s. | g/100 g | 10.1 | 6.6 | 3.8 | 1.7 | 1.1 | 0.8 |
| Osmonics | xylose | g/100 g | 6.6 | 4.5 | 2.5 | 1.1 | 0.7 | 0.5 |
| | Retention | % | −39.0 | −2.3 | 31.1 | 59.2 | 64.6 | 63.5 |
| Permeate from | Perm. flux | kg/m$^2$/h | 2.7 | 5.2 | 7.6 | 19.7 | 22.8 | 20.5 |
| Desal-5 DL | Perm. d.s. | g/100 g | 10.6 | 7.4 | 4.6 | 2.3 | 1.5 | 1.2 |
| Osmonics | xylose | g/100 g | 7.0 | 4.9 | 3.1 | 1.3 | 1.0 | 0.7 |
| | Retention | % | −47.6 | −12.6 | 14.5 | 48.8 | 46.0 | 43.8 |

TABLE 9-continued

| | | | | | | | | |
|---|---|---|---|---|---|---|---|---|
| Permeate from | Perm. flux | kg/m²/h | 2.7 | 4.3 | 5.7 | 17.0 | 19.7 | 17.3 |
| NFT-50 | Perm. d.s. | g/100 g | 10.3 | 6.7 | 3.6 | 1.5 | 0.9 | 0.6 |
| Alfa-Laval | xylose | g/100 g | 6.0 | 4.0 | 2.1 | 0.7 | 0.5 | 0.3 |
| | Retention | % | −25.5 | 9.4 | 43.4 | 72.3 | 74.8 | 76.1 |

TABLE 10

| | | | | | | | | |
|---|---|---|---|---|---|---|---|---|
| Xylose solution B | Feed d.s. | % | 42.2 | 36.5 | 32.2 | 23.4 | 16.7 | 12.3 |
| | xylose | %/d.s. | 20.9 | 20.8 | 20.8 | 20.8 | 20.3 | 19.5 |
| | xylose | g/100 g | 8.8 | 7.6 | 6.7 | 4.9 | 3.4 | 2.4 |
| Permeate from | Perm. flux | kg/m²/h | 0.4 | 0.8 | 2.2 | 7.1 | 19.0 | 33.7 |
| Desal-5 DK | Perm. d.s. | g/100 g | 26.0 | 19.3 | 11.6 | 5.1 | 2.0 | 2.0 |
| Osmonics | xylose | g/100 g | 12.2 | 10.1 | 6.6 | 3.0 | 1.2 | 0.7 |
| | Retention | % | −38.9 | −32.4 | 1.9 | 38.2 | 65.4 | 69.8 |
| Permeate from | Perm. flux | kg/m²/h | 0.6 | 1.4 | 3.3 | 9.8 | 22.0 | 36.9 |
| Desal-5 DL | Perm. d.s. | g/100 g | 25.9 | 19.6 | 12.2 | 5.7 | 2.7 | 1.7 |
| Osmonics | xylose | g/100 g | 12.2 | 9.9 | 7.0 | 3.4 | 1.6 | 1.0 |
| | Retention | % | −38.8 | −30.4 | −3.9 | 29.9 | 53.0 | 57.7 |
| Permeate from | Perm. flux | kg/m²/h | 1.0 | 2.0 | 4.0 | 8.3 | 19.3 | 33.3 |
| NFT-50 | Perm. d.s. | g/100 g | 26.0 | 20.5 | 12.0 | 5.3 | 2.1 | 1.2 |
| Alfa-Laval | xylose | g/100 g | 11.5 | 9.5 | 6.1 | 2.8 | 1.1 | 0.6 |
| | Retention | % | −30.7 | −25.1 | 9.1 | 41.5 | 67.1 | 73.8 |

TABLE 11

| | | | | | | | | |
|---|---|---|---|---|---|---|---|---|
| Xylose solution C | Feed d.s. | % | 41.9 | 36.8 | 29.0 | 21.7 | 15.1 | 12.4 |
| | xylose | %/d.s. | 50.0 | 49.2 | 53.8 | 52.0 | 50.0 | 50.0 |
| | xylose | g/100 g | 21.0 | 18.1 | 15.6 | 11.3 | 7.6 | 6.2 |
| Permeate from | Perm. flux | kg/m²/h | 1.3 | 1.5 | 2.7 | 8.1 | 18.3 | 29.5 |
| Desal-5 DK | Perm. d.s. | g/100 g | 30.0 | 25.2 | 17.4 | 8.4 | 3.6 | 2.4 |
| Osmonics | xylose | g/100 g | 21.0 | 19.8 | 12.2 | 5.9 | 2.5 | 2.0 |
| | Retention | % | −12.9 | −9.5 | 22.0 | 47.9 | 66.6 | 68.1 |
| Permeate from | Perm. flux | kg/m²/h | 2.1 | 2.6 | 4.3 | 12.1 | 23.5 | 34.9 |
| Desal-5 DL | Perm. d.s. | g/100 g | 30.3 | 25.3 | 18.8 | 9.2 | 4.0 | 3.4 |
| Osmonics | xylose | g/100 g | 23.7 | 20.1 | 15.4 | 7.8 | 3.1 | 2.8 |
| | Retention | % | −13.1 | −10.7 | 1.4 | 30.9 | 59.0 | 55.4 |
| Permeate from | Perm. flux | kg/m²/h | 3.0 | 2.7 | 3.5 | 9.3 | 21.3 | 29.7 |
| NFT-50 | Perm. d.s. | g/100 g | 30.1 | 25.4 | 19.2 | 10.1 | 4.1 | 2.5 |
| Alfa-Laval | xylose | g/100 g | 22.3 | 18.7 | 13.8 | 7.0 | 3.1 | 1.8 |
| | Retention | % | −6.2 | −3.2 | 11.8 | 38.1 | 58.6 | 70.3 |

EXAMPLE 4

Reduction of Retention of Xylose

Separation of xylose/xylonic acid in water solution has been studied using the Desal-5 DL nanofiltration membrane, three rectangular flat sheet modules in parallel (0.0046 m²/membrane).

The retention of the compounds was measured at different pH's using MgO to adjust the pH. In addition, the effect of pressure (flux) on the retention was studied. The studied pH range was from 3.4-6. The experiments were made in the temperature of 40° C. and in a pressure of 16 bar. The pressure was increased when a constant permeate flux needed to be obtained. The cross-flow velocity was about 6 m/s. The experiments were made in total recycling mode. A minor change in feed composition occurred because samples were taken during the experiments. The results are shown in table 11A and 11B.

TABLE 11A

| pH | Feed KF DS % | Xylose in retentate g/100 g | Xylose in retentate % on DS | Xylonic acid in retentate % on DS |
|---|---|---|---|---|
| 3.4 | 8.3 | 1.9 | 23.1 | 19 |
| 3.4 | 8.3 | 1.9 | 23.1 | 19 |
| 4.3 | 7.7 | 1.8 | 23.6 | 18.8 |
| 5.9 | 7.4 | 1.8 | 24 | 19 |
| 5.9 | 7.4 | 1.8 | 24 | 19 |

TABLE 11B

| | Permeate | | | | Retention | |
|---|---|---|---|---|---|---|
| pH | flux L/(m²h) | Permeate RDS % | Xylose % on DS | Xylonic acid % on DS | Xylose | Xylonic acid |
| 3.4 | 22 | 1.4 | 32.3 | 27.9 | 77% | 74% |
| 3.4 | 24 | 1.5 | 32.9 | 27.2 | 76% | 74% |
| 4.3 | 35 | 2.2 | 35 | 16.1 | 58% | 76% |
| 5.9 | 47 | 2.6 | 43 | 9.6 | 37% | 82% |
| 5.9 | 56 | 3.2 | 39.2 | 10.9 | 31% | 76% |

The decreased retention for xylose, when pH was increased, was seen when xylose was nanofiltered with xylonic acid at various pH values.

The membrane retained xylonic acid slightly better at higher pH which means that the osmotic pressure difference between the retentate and the permeate side of the membrane was greatly enhanced.

EXAMPLE 5A

Separation of binary and tertiary mixtures of organic compounds in water solution was studied using the Desal-5 DL nanofiltration membrane. The studied compounds were betaine, glycerol, citric acid and potassium sulphate. Table 12 shows some characteristic properties of the compounds. The cut-off value for the Desal-5 DL membrane was between 150-300 g/mol and its pore radius was about 0.45 nm. The sessile drop contact angle value for the Desal-5 DL membrane is 40°. The contact angle is a measure of hydrophobicity, the higher the contact angle the more hydrophobic the membrane. The membrane was mostly negatively charged on the studied pH range.

Retention of the compounds was measured at different pHs and at relatively high feed concentrations (1-17%). In addition, the effect of pressure (flux) and salt addition on the retention was studied. The pH of the solution was adjusted using sodium hydroxide. The studied pH range was from 1.7 to 7.3. The feed solution contained about ten times more citric acid than betaine. The studied salt concentrations were 5, 10 and 15 g/l. The experiments were made in a temperature range of 45-50° C. and in a pressure range from 10-42 bar using a DSS Labstak M20 filter. The pressure was increased when a constant permeate flux needed to be obtained. The cross-flow velocity was about 1 m/s at 50° C. The experiments were made in total recycling mode. A minor change in feed composition occurred because samples were taken during the experiments.

TABLE 12

CHARACTERISTIC PROPERTIES OF MODEL COMPOUNDS

| Compound | Citric acid | Betaine | Glycerol | K-sulphate |
|---|---|---|---|---|
| Molar mass, g/mol | 192.1 | 117.1 | 92.1 | 174.3 |
| pKa | 3.14, 4.77, 6.39 | 1.83 | 14.4 | |
| LogP$_{OW}$ | −1.67 | −2.93 | −1.76 | |
| Water solubility | 592 g/l | 611 g/l | 1000 g/l | |

The samples from glycerol and citric acid filtration were analysed in HPLC using Na⁺-form SAC-column (0.003M Na$_2$SO$_4$, 0.6 ml/min, 85° C.). Betaine and citric acid were analysed using H⁺-form SAC-column (Shodex sugar SH1011, 0.01 N H$_2$SO$_4$, 0.6 ml/min, 60° C., UV210 nm and RI detector). Ions were analysed by ion chromatography.

The experiments separately with pure betaine and citric acid solutions with desal 5DL membrane at 30-40° C. and flux 65-80 l/m² h showed that betaine was significantly better retained at acid pH although its molar mass is lower than citric acid's (see Table 12). Betaine is more hydrophobic than citric acid and this might improve its retention when filtered alone. When the pH of citric acid solution is increased its retention increased due to dissociation of acidic groups in the molecule. Similarly the negative charge of the Desal-5 membrane increased. Therefore, electrostatic repulsion between dissociated citric acid molecules and negatively charged membranes generated high retention. The retention of pure betaine solution was not affected by pH.

TABLE 13

RETENTION AT VARIOUS PHS IN ONE COMPONENT SOLUTIONS

| pH-values | Betaine | Citric acid |
|---|---|---|
| 2-2.7 | 90% | 37% |
| 4.3 | 90% | 85% |
| 5.5 | 90% | 98% |
| 6.7 | 90% | 100% |

When citric acid and betaine were filtered in binary solution or in tertiary solution with potassium sulphate an interesting phenomenon was observed. The retention of citric acid increased significantly with the increase of pH as when the pure solution was filtered. On the contrary, betaine retention was affected by the increase of citric acid retention with pH. The retention of citric acid, betaine and potassium sulphate in the nanofiltration using the Desal-5 DL membrane (feed composition: citric acid 12.9-9.5%, betaine 1.25-0.87%, potassium 0.78-0.57% and sodium 0-3.4%; feed DS 14-17%, 50° C.) is shown in FIG. 1. As FIG. 1 shows even negative retention for betaine was measured at high pH, i.e., when citric acid retention was high. At the same time the flux decreased but this cannot explain the dramatic change in the retention of betaine. When pH was adjusted a significant amount sodium hydroxide, up to 3.4% in liquid mass was added. Therefore the feed dry solid increased from 14% to 17%. This facilitate the permeation of betaine and citric acid because higher diffusion at higher concentrations. However, the change in the feed concentration (dry solids) was only three percent. The osmotic pressure of the feed solution also increased significantly when pH was increased. In addition, the membrane retained citric acid and ions significantly better at high pH which means that the osmotic pressure difference between the feed and the permeate side of the membrane is greatly enhanced. This was also seen in pressures that were needed to overcome the osmotic pressure in FIG. 1. It might be possible that a high osmotic pressure difference facilitate the permeation of betaine. The difference in retention between citric acid and betaine was form −45% to 150% when the pH changed from 1.8 to 7.2. In the test at pH 7.2 betaine concentration increased from 1.25-0.87% in feed to about 1.6% in permeate and same time betaine content in relation to citric acid changed from about 1:10 in feed to about 1:0.7 in permeate.

TABLE 14

RETENTION OF BETAINE AND CITRIC ACID AT VARIOUS PHS IN BINARY SOLUTIONS

| pH-value | Betaine | Citric acid |
|---|---|---|
| 1.8 | 65% | 20% |
| 3.5 | 39% | 19% |

TABLE 14-continued

RETENTION OF BETAINE AND CITRIC ACID AT VARIOUS PHS IN BINARY SOLUTIONS

| pH-value | Betaine | Citric acid |
|---|---|---|
| 4.0 | 24% | 41% |
| 5.0 | −22% | 68% |
| 7 | −60% | 90% |

Figure 2:
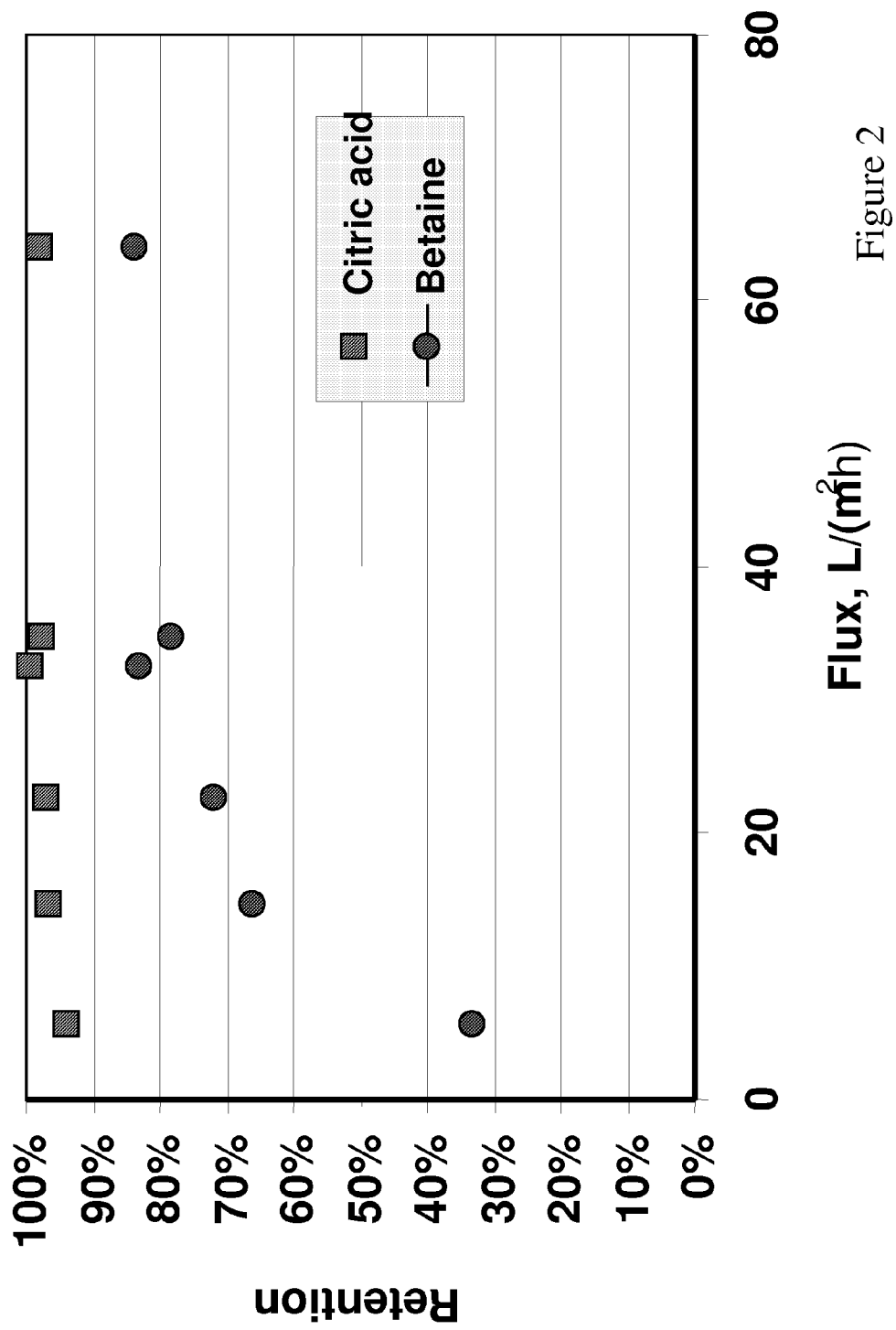
FIG. 2 is a graphical presentation of the effect of permeate flux on the retention of betaine and citric acid at pH 6 of Example 5A.

The permeate flux has also significant effect on the retention of the individual compounds as well as on the separation of betaine and citric acid. The effect of permeate flux on the retention of betaine and citric acid at pH 6 (feed dry solids 8.6-9.1%, citric acid 4.4-5.3 g/100 g and betaine 0.55-0.6 g/100 g, 45° C.) is shown in FIG. 2. FIG. 2 shows that the retention of betaine clearly increased when flux (pressure) increased. At pH 6, citric acid was retained by size and charge effect and was not so clearly affected by the flux. At low flux values the difference in the retention of betaine and citric acid was about 60% but only 15% when high flux was used. Thus, the flux had significant effect on the separation of these two compounds. At high osmotic pressure conditions the diffusive transport attempted to equalize the concentration difference between the permeate and the concentrate side of the membrane pushing betaine through.

In FIG. 2, betaine retention was always positive at pH 6. In this filtration the feed dry solids was 8.6-9.9% and thus lower than in FIG. 1 where the feed dry solids was 14-17%. Therefore, the high feed dry solids and low flux simultaneously with high retention of citric acid facilitated the permeation of betaine. Most probably the increase of the amount of citric acid would also push more betaine to permeate.

EXAMPLE 5B

The improved negative retention for neutral organic compounds was also seen when glycerol was nanofiltered with citric acid at increasing pH values.

Figure 3:
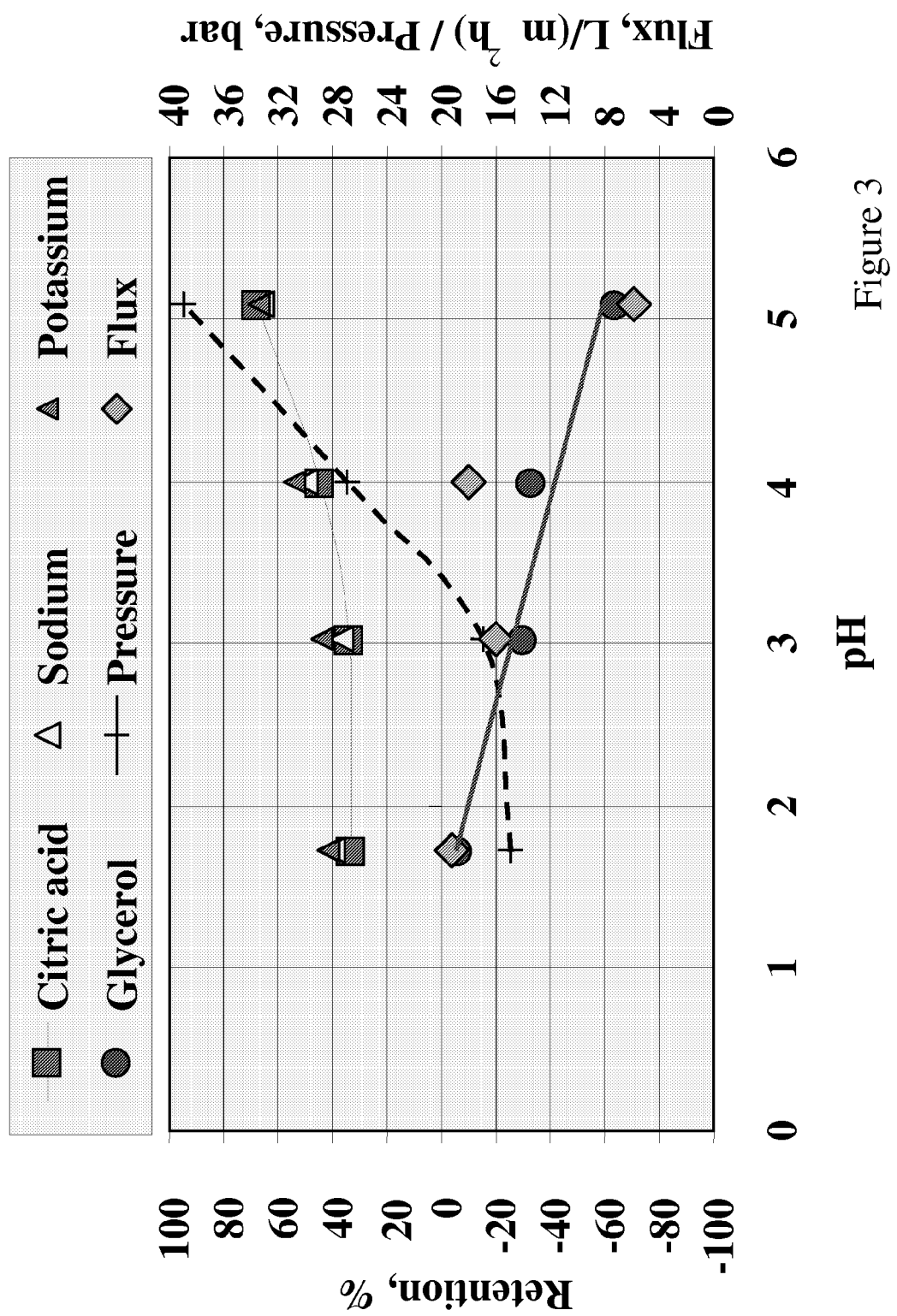
FIG. 3 is a graphical presentation of the retentions of citric acid, glycerol and potassium sulphate in the nanofiltration of Example 5B.
Figure 4:
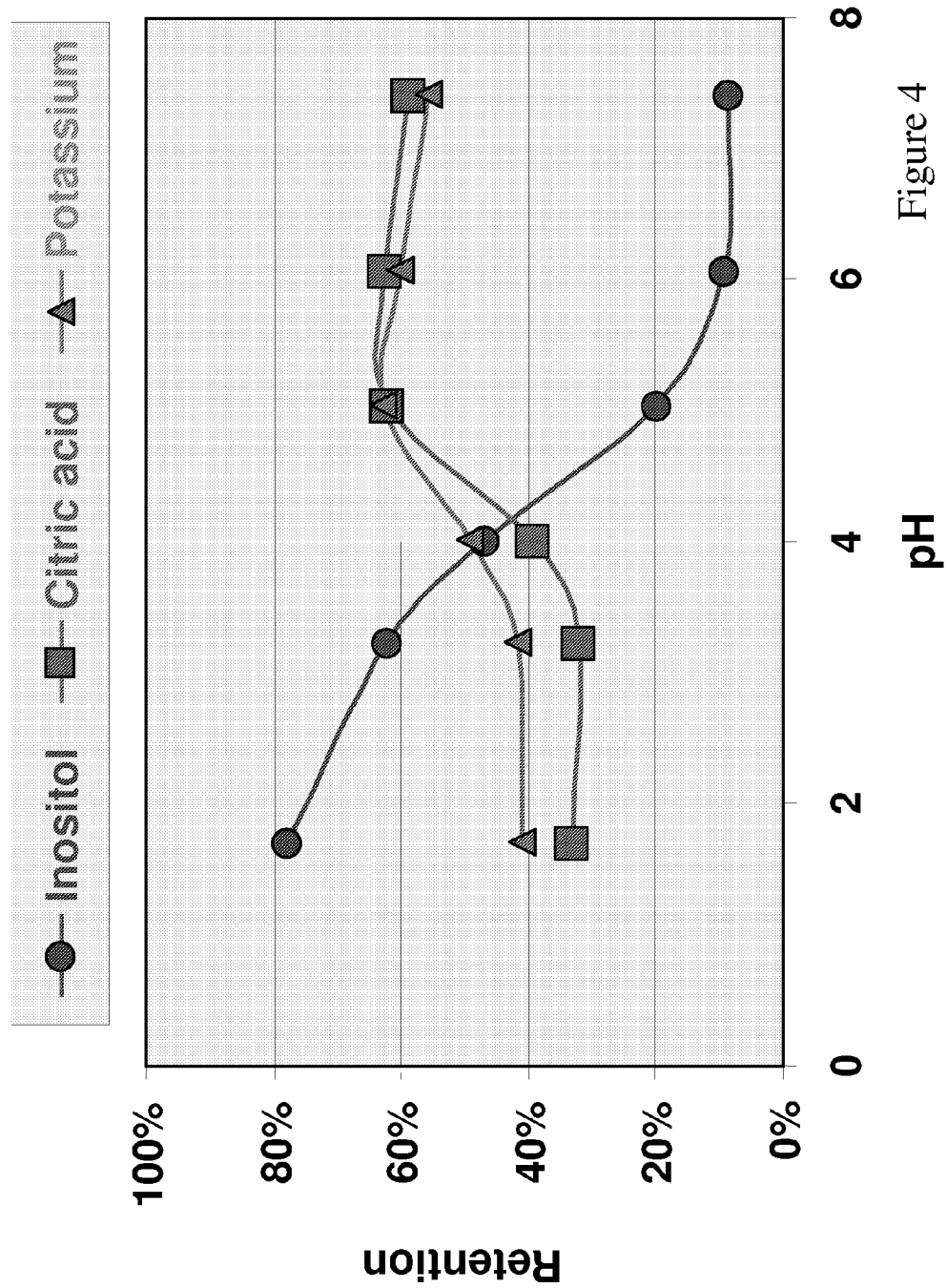
FIG. 4 is a graphical presentation of the retentions of citric acid, inositol and potassium sulphate in the nanofiltration of Example 5B.

The retentions of citric acid, glycerol and potassium sulphate (feed composition: citric acid 12.4-9.9%, glycerol 1.1-0.9%, potassium 0.8-0.7% and sodium 0-3.7%; feed DS 14-18%, pressure 15-39 bar) and the retentions of citric acid, inositol and potassium sulphate (feed composition: citric acid 12.6-10.5%, inositol 1.2-1.0%, potassium 0.8-0.6% and sodium 0-3.8%; feed DS 12-16%, pressure 17-42 bar) in the nanofiltration are shown in FIGS. 3 and 4, respectively.

As FIG. 3 shows that adjusting pH from pH 1.8 to pH 5 improved permeation of glycerol and the negative retention for glycerol was −60% at pH 5 increasing the glycerol content in the feed 1% to 1.6% in permeate. Difference in the retention of citric acid and glycerol was then over 120% units. In FIG. 4 the significant effect of pH adjustment on the permeation of inositol is seen although the retention of inositol was not turned to negative.

The negative retention for organic compounds in nanofiltration was studied with organic acid, neutral molecule and salt. Compounds capable to dissociate (citric acid) were better retained when the pH was increased as assumed. Furthermore, the retention of neutral compounds changed dramatically in an opposite direction with the change of the retention of dissociated compounds. As a result a negative retention of neutral organic compounds was observed. The highest negative retention was −60% meaning a 140% units difference in retention of the dissociated (citric acid) and the neutral (betaine) organic compounds. Thus, the increase in retention of better retained compounds decreased the retention of another compound (neutral compound) the retention of which was not pH dependent when filtered alone.

EXAMPLE 6

The nanofiltration experiments to separation of xylose and citric acid were performed with DSS LabStak M20 filtration unit. Same time up to 20 membranes, which are settled one on top of the other in the equipment can be used. The area of each membrane was 360 cm$^2$. Membranes Desal 5dL and NF270 were used in the tests.

In the experiments pure xylose and citric acid were used to produce solution. Xylose and citric acid solutions were filtered with DSS-filter as function of pH in three different mole ratios. The amount of citric acid varied in relation to xylose 1:1, 1:3 and 1:5 moles. In the 1:1 mole ratio the total concentration was 61 g/l and xylose concentration was 27 g/L (about 0.18 mol/L) and citric acid concentration was about 35 g/l (about 0.18 mol/L) in the feed solution. In the 1:3 mole ratio the total concentration was 123 g/l and concentrations were 24 g/l (about 0.16 mol/L) for xylose and about 99 g/l (about 0.52 mol/l) for citric acid. In the 1:5 mole ratio the total concentration was 179 g/l and concentrations were about 23 g/l (about 0.15 mol/l) for xylose and about 156 g/l (~0.81 mol/L) for citric acid. Sodium hydroxide solution was used to adjust pH (five pH values, from natural pH to pH about 6.5). Temperature was kept at the level 60° C. The total permeate flux of Desal-5-DL membrane was kept close to the level about 7 l/(m$^2$ h). In mole ratios 1:3 and 1:5 in higher pH values the flux remained lower due to limitations of maximum pressure of the equipment The permeate flux of NF270 membrane was not adjusted with pressure control. It was measured at the same time when the permeate flux of Desal-5-DL membrane was measured and also permeate samples were taken at the same time. Xylose was analysed by HPLC equipment and Pb-form column and citrate was analysed by ion chromatography equipment.

From the tables 15, 16 and 17 below it can be seen that the negative retention of xylose is enhanced when pH is increased from 1.3 up to 6.4 and when the citric acid concentration is increased in relation to xylose.

TABLE 15

| | XYLOSE - CITRIC ACID, 1:1 MOL | | | | | | |
|---|---|---|---|---|---|---|---|
| pH | Xylose retention, % Desal-5-DL | Xylose retention, % NF270 | Citrate retention, % Desal-5-DL | Citrate retention, % NF270 | Flux, L/(m$^2$h) Desal-5-DL | Flux, L/(m$^2$h) NF270 | Filtration pressure, bar |
| 1.9 | 18.4 | 16.8 | 20.9 | 17.8 | 7.5 | 1.7 | 5.5 |
| 3.2 | 11.4 | 11.2 | 19.9 | 40.3 | 7.1 | 1.4 | 5.5 |
| 4.2 | 5.3 | 5.1 | 34.3 | 32.9 | 6.9 | 1.3 | 7.3 |

TABLE 15-continued

XYLOSE - CITRIC ACID, 1:1 MOL

| pH | Xylose retention, % Desal-5-DL | Xylose retention, % NF270 | Citrate retention, % Desal-5-DL | Citrate retention, % NF270 | Flux, L/(m²h) Desal-5-DL | Flux, L/(m²h) NF270 | Filtration pressure, bar |
|---|---|---|---|---|---|---|---|
| 5.2 | 2.1 | 6.6 | 79.2 | 73.2 | 7.0 | 4.3 | 14.5 |
| 6.4 | 0.26 | 0.17 | 94.0 | 92.1 | 7.1 | 13 | 16.8 |

TABLE 16

XYLOSE - CITRIC ACID, 1:3 MOL

| pH | Xylose retention, % Desal-5-DL | Xylose retention, % NF270 | Citrate retention, % Desal-5-DL | Citrate retention, % NF270 | Flux, L/(m²h) Desal-5-DL | Flux, L/(m²h) NF270 | Filtration pressure, bar |
|---|---|---|---|---|---|---|---|
| 1.6 | 26.3 | 24.3 | 21.4 | 22.0 | 7.6 | 2.2 | 8.8 |
| 3.0 | 12.2 | 9.7 | 20.9 | 20.9 | 7.3 | 1.4 | 8.8 |
| 4.1 | 2.4 | 5.1 | 32.1 | 30.3 | 6.8 | 1.1 | 13.3 |
| 5.3 | −9.8 | −6.7 | 67.2 | 63.9 | 5.2 | 4 | 30.5 |
| 6.4 | −11.3 | −9.9 | 60.4 | 75.5 | 2.1 | 3.8 | 36 |

TABLE 17

XYLOSE - CITRIC ACID, 1:5 MOL

| pH | Xylose retention, % Desal-5-DL | Xylose retention, % NF270 | Citrate retention, % Desal-5-DL | Citrate retention, % NF270 | Flux, L/(m²h) Desal-5-DL | Flux, L/(m²h) NF270 | Filtration pressure, bar |
|---|---|---|---|---|---|---|---|
| 1.4 | 29.7 | 25.2 | 23.5 | 20.6 | 6.8 | 2.3 | 12.3 |
| 3.0 | 12.7 | 11.0 | 22.6 | 22.1 | 7.4 | 1.2 | 13.3 |
| 4.0 | −1.6 | −0.8 | 29.1 | 24.6 | 6.8 | 0.9 | 17.8 |
| 5.0 | −15.5 | −12.2 | 46.7 | 39.1 | 3.5 | 1.6 | 35 |
| 6.3 | −6.1 | −9.8 | 20.2 | 33.1 | 1.3 | 1 | 36.5 |

EXAMPLE 7

Figure 5:
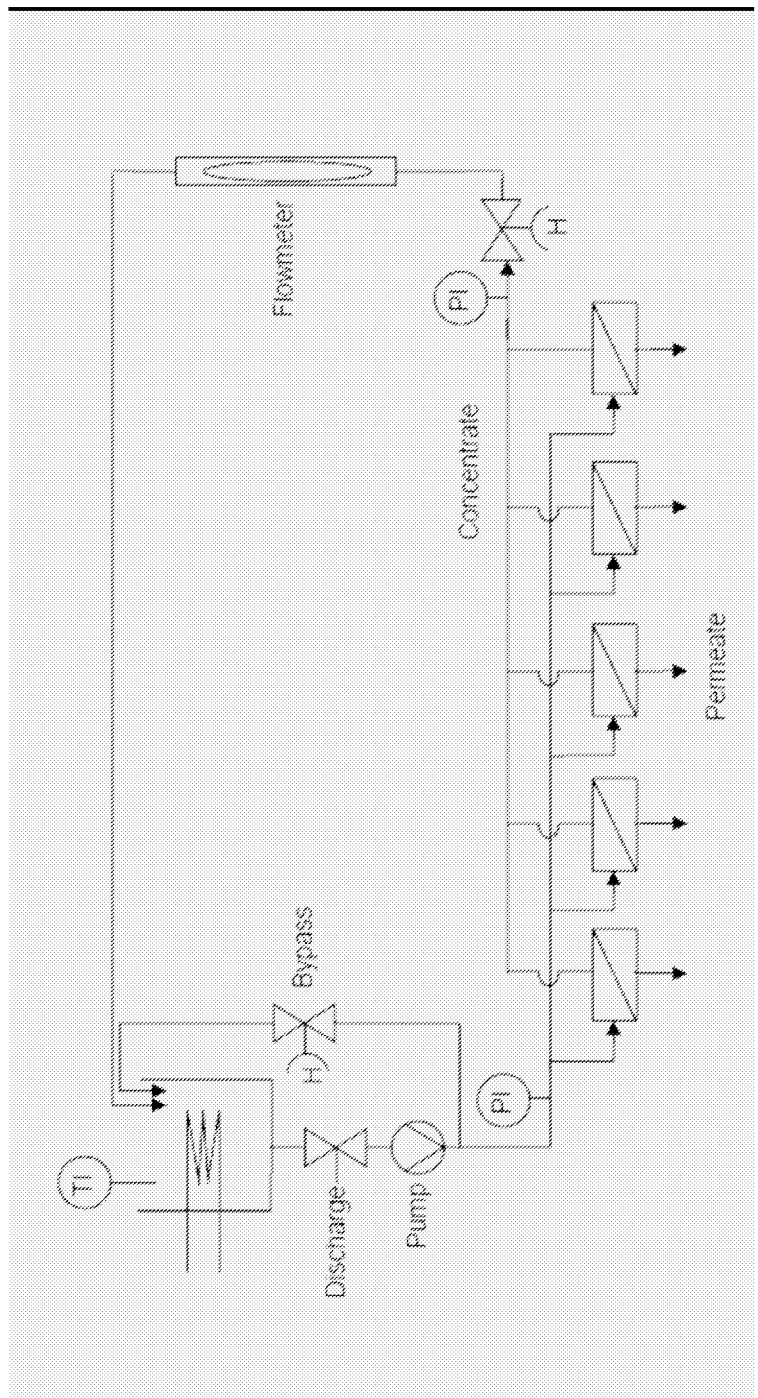
FIG. 5 is a flow diagram of five-cell filtration equipment of Example 7.

In the nanofiltration of xylose and lactone of gluconic acid (glucono-delta-lactone (GDL) the flat-sheet laboratory-scale equipment with three cells in parallel was used for the experiments. The area of each membrane is 100 cm². The volume of feed solution in tank was about 10 dm³. The flow diagram of five-cell filtration equipment, which is identical with three-cell filtration equipment, is presented in FIG. 5.

In the experiments pure xylose and glucono-delta-lactone were used for the production of test solutions. Xylose and GDL solutions were filtered with three cell filters as function of pH in two different mole ratios. The amount of GDL varied in relation to xylose 1:1 and 1:5 moles. In the 1:1 mole ratio xylose concentration was 20 g/l (about 0.13 mol/l) and gluconic acid concentration was about 25 g/l (about 0.13 mol/L) in the feed solution. In the 1:5 mole ratio concentrations were about 19 g/l (about 0.13 mol/L) and about 118 g/l (~0.60 mol/l) respectively. Sodium hydroxide solution was used to adjust pH (five pH values, from natural pH 2.2 to pH 6.1 in 1:1 mole ratio and from pH 1.8 to pH 6.2 in mole ratio 1:5). Temperature was kept at the level 65° C. The permeate flux of Desal-5-DL membrane was kept almost constant (about 5 L/(m²h)) in both mole ratios and in every pH. The permeate flux of NF270 membrane was not adjusted with pressure control. It was measured at the same time when the permeate flux of Desal-5-DL membrane was measured and also permeate samples were taken on same time.

Test results in tables 18 and 19 below show that the retention of xylose is decreased and the negative retention is achieved when pH of the xylose-GDL solution is increased from about pH 2 to about pH 6. The higher concentration of GDL favours lower xylose retentions.

TABLE 18

XYLOSE - GDL 1:1 MOL

| pH | Xylose retention, % Desal-5-DL | Xylose retention, % NF270 | Gluconate retention, % Desal-5-DL | Gluconate retention, % NF270 | Flux, L/(m²h) Desal-5-DL | Flux, L/(m²h) NF270 | Filtration pressure, bar |
|---|---|---|---|---|---|---|---|
| 2.2 | 5.2 | 11.1 | 15.5 | 19.2 | 5.1 | 0.9 | 0.5 |
| 3.3 | 9.9 | 7.7 | 15.7 | 20.0 | 5.9 | 0.9 | 1.0 |
| 4.6 | 4.6 | 1.6 | 24.8 | 26.8 | 4.8 | 0.8 | 1.8 |
| 5.4 | 1.1 | −2.5 | 32.4 | 35.8 | 4.7 | 2.1 | 1.8 |
| 6.1 | 1.9 | −0.95 | 44.8 | 48.2 | 4.6 | 4.5 | 2.8 |

TABLE 19

XYLOSE - GDL, 1:5 MOL

| pH | Xylose retention, % Desal-5-DL | Xylose retention, % NF270 | Gluconate retention, % Desal-5-DL | Gluconate retention, % NF270 | Flux, L/(m²h) Desal-5-DL | Flux, L/(m²h) NF270 | Filtration pressure, bar |
|---|---|---|---|---|---|---|---|
| 1.8 | 7.3 | 18.0 | 5.9 | 15.2 | 5.0 | 1.1 | 2 |
| 3.1 | 4.9 | 6.0 | 8.8 | 15.2 | 5.7 | 1.0 | 3 |
| 4.1 | −1.2 | 0.05 | 9.6 | 19.8 | 4.5 | 0.7 | 4.5 |
| 5.0 | −2.1 | −2.4 | 21.4 | 21.2 | 4.2 | 1.4 | 7.5 |
| 6.2 | −4.2 | −5.4 | 32.8 | 33.2 | 4. | 5.5 | 11 |

EXAMPLE 8

Nanofiltration of xylose and lactose was performed with same equipment than previously mentioned in example 7 for xylose and gluconodelta lactone.

Xylose and lactose solution was filtered with three cell filter as function of the permeate flux in 1:5 mole ratio in natural pH 5.21. In the 1:5 mole ratio xylose concentration was about 20 g/L (about 0.13 mol/L) and lactose concentration about 251 g/L (about 0.73 mol/L). Desal-5-DL nanofiltration membrane was used.

TABLE 20

XYLOSE - LACTOSE, 1:5 MOL

| Flux, L/(m²h) | Lactose retention, % | Xylose retention, % | Filtration pressure |
|---|---|---|---|
| 1.0 | 58.6 | −15.4 | 15.6 |
| 3.2 | 78.8 | −18.2 | 20.5 |
| 3.7 | 82.1 | −13.7 | 23.3 |
| 7.6 | 89.2 | −16.3 | 23.8 |
| 17.5 | 94.2 | −5.03 | 27.3 |

The invention claimed is:

1. A nanofiltration process for separating at least one target neutral organic compound selected from pentose and hexose sugars and their corresponding sugar alcohols, betaine, glycerol and inositol, from a multicomponent or binary solution also containing one or more non-target organic compounds by nanofiltration, where the said at least one target compound is enriched into the permeate, and the negative retention of said at least one target compound or the permeation into the permeate of said at least one target compound is enhanced by increasing the content of one or more of said non-target organic compounds added to a feed solution for the nanofiltration or to retentate which is recycled to the nanofiltration, in an amount sufficient to result in a molar ratio of the said at least one target compound to the one or more non-target organic compounds to be in the range of 1:10.8 to 7.5:1 in the feed or retentate solution in which the one or more non-target organic compounds is increased.

2. The process as claimed in claim 1, wherein increasing the content of the one or more non-target organic compounds is facilitated by its improved accumulation into retentate during nanofiltration or by adding it as such into feed/retentate.

3. The process as claimed in claim 1, wherein the content of the one or more non-target organic compounds is increased in the feed of nanofiltration.

4. The process as claimed in claim 1, wherein the one or more non-target organic compounds is selected from glucose, a disaccharide, a hydroxy acid and an aldonic acid.

5. The process as claimed in claim 4, wherein the disaccharide is lactose, maltose or cellobiose.

6. The process as claimed in claim 4, wherein the hydroxy acid is citric acid.

7. The process as claimed in claim 4, wherein the aldonic acid is xylonic acid or gluconic acid.

8. The process as claimed in claim 1, wherein nanofiltration is performed by batch or continuous mode.

9. The process as claimed in claim 8, wherein the content of the one or more non-target organic compounds is increased by its addition into the retentate in the last stage or in one or several last stages of a multi-stage continuous nanofiltration operation mode.

10. The process as claimed in claim 8, wherein the content of the one or more non-target organic compounds is increased in the retentate by the end of the batch mode operation.

11. The process as claimed in claim 1, wherein the content of the one or more non-target organic compounds is increased by its addition into the retentate in the last stage or in one or several last stages of a multi-stage continuous nanofiltration operation mode.

12. The process as claimed in claim 1, wherein negative retention or permeation of the at least one target neutral organic compound is further enhanced by adjusting one or more nanofiltration process parameters selected from the pH, the pressure, the flux, the temperature, and the concentration of feed in the feed solution.

13. The process as claimed in claim 12, wherein negative retention or permeation of the at least one target neutral organic compound is further enhanced by adjusting pH to the range of 1 to 11.

14. The process as claimed in claim 12, wherein the at least one non-target organic compound is an organic acid, and the negative retention or permeation of the at least one target neutral organic compound is further enhanced by adjusting the pH of the feed solution to be equal or higher than the pK value of said organic acid.

15. The process as claimed in claim 12, wherein negative retention or permeation of the at least one target neutral organic compound is further enhanced by adjusting the flux within the range of 0.7-15 kg/(m²h) solution.

16. The process as claimed in claim 12, wherein negative retention or permeation of the at least one target neutral organic compound is further enhanced by adjusting the total feed concentration in the feed solution within the range of 50-600 g/l (5-60% D.S.).

17. The process as claimed in claim 1, wherein the content of said one or more non-target organic compounds is increased in said feed solution or said retentate in an amount sufficient to result in a molar ratio of said at least one target neutral organic compound to said one or more non-target organic compounds to be in the range of 1:5 to 4:1.

18. The process as claimed in claim 12, wherein negative retention or permeation of the at least one target neutral organic compound is further enhanced by adjusting the pH of the feed solution to the range of 2 to 7.

19. The process as claimed in claim 12, wherein negative retention or permeation of the at least one target neutral organic compound is further enhanced by adjusting the pH of the feed solution to the range of 4 to 6.

20. The process as claimed in claim 12, wherein negative retention or permeation of the at least one target neutral organic compound is further enhanced by adjusting the flux within the range of 1-6 kg/(m$^2$h) solution.

21. The process as claimed in claim 12, wherein negative retention or permeation of the at least one target neutral organic compound is further enhanced by adjusting the flux within the range of 1-4 kg/(m$^2$h) solution.

22. The process as claimed in claim 12, wherein negative retention or permeation of the at least one target neutral organic compound is further enhanced by adjusting the total feed concentration in the feed solution within the range of 200-300 g/l (20-30% D.S.).

23. The process as claimed in claim 1, wherein the at least one target neutral organic compound is selected from xylose, arabinose, mannose, glucose, galactose, fructose, rhamnose and the corresponding sugar alcohols.

24. The process as claimed in claim 1, wherein the content of said one or more non-target organic compounds is increased in said feed solution or said retentate in an amount sufficient to result in a molar ratio of said at least one target neutral organic compound to said one or more non-target organic compounds to be in the range of 1:3 to 2:1.

25. The process as claimed in claim 1 wherein the nanofiltration membrane is selected from sulfonated polysilfone membranes and polypiperazine membranes.

26. The process as claimed in claim 1, wherein negative retention of the at least one target neutral organic compound is such that the concentration of said compound, expressed as g/100 g or g/L of solution, is higher in the permeate liquid than it is in the retentate at the same point in time.

27. The process as claimed in claim 1, wherein the content of said one or more non-target organic compounds is increased in said feed solution or said retentate in an amount sufficient to result in a molar ratio of said at least one target neutral organic compound to said one or more non-target organic compounds to be 1:1.

* * * * *